(12) United States Patent
Mittal et al.

(10) Patent No.: US 11,233,792 B2
(45) Date of Patent: Jan. 25, 2022

(54) METHOD AND SYSTEM FOR ENHANCED LOGIN CREDENTIAL SECURITY VIA BLOCKCHAIN

(71) Applicant: MASTERCARD INTERNATIONAL INCORPORATED, Purchase, NY (US)

(72) Inventors: Shreya Mittal, Delhi (IN); Amit Gupta, New Delhi (IN); Ankur Arora, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 94 days.

(21) Appl. No.: 15/968,833

(22) Filed: May 2, 2018

(65) Prior Publication Data
US 2019/0342290 A1    Nov. 7, 2019

(51) Int. Cl.
*H04L 29/06* (2006.01)
*H04L 9/32* (2006.01)

(52) U.S. Cl.
CPC ........ *H04L 63/0884* (2013.01); *H04L 9/3213* (2013.01); *H04L 9/3236* (2013.01);
(Continued)

(58) Field of Classification Search
CPC .......................... H04L 63/0884; H04L 63/083
See application file for complete search history.

(56) References Cited

U.S. PATENT DOCUMENTS

| 2008/0016232 A1 | 1/2008 | Yared et al. |
| 2016/0359829 A1 | 12/2016 | Gulledge |

(Continued)

FOREIGN PATENT DOCUMENTS

| CN | 106952094 A | 7/2017 |
| CN | 107369008 A | 11/2017 |

(Continued)

OTHER PUBLICATIONS

Olivier Alphand, "IoTChain: A Blockchain Security Architecture for the Internet of Things", Apr. 2018, hal-01705455, pp. 2-7.*

(Continued)

*Primary Examiner* — Andrew J Steinle
(74) *Attorney, Agent, or Firm* — Buchanan Ingersoll & Rooney PC

(57) ABSTRACT

A method for secure storage and distribution of account tokens includes: storing blockchain data comprised of a plurality of blocks, each block including at least a block header and one or more data values, where each data value includes at least an identification value, an account token, and one or more usage rules; receiving a login request including at least a specific identification value and a set of credentials; identifying a specific data value included in the blockchain data where the included identification value corresponds to the received specific identification value; validating the set of credentials based on the identified specific data value and access to the account token included in the specific data value based on the included one or more usage rules; and transmitting the account token included in the identified specific data value in response to the login request upon successful validation.

20 Claims, 6 Drawing Sheets

(52) U.S. Cl.
CPC .......... *H04L 9/3297* (2013.01); *H04L 63/083* (2013.01); *H04L 63/108* (2013.01); *H04L 2209/38* (2013.01)

(56) References Cited

U.S. PATENT DOCUMENTS

| | | | |
|---|---|---|---|
| 2017/0161733 A1* | 6/2017 | Koletsky | G06Q 20/3829 |
| 2017/0257358 A1 | 9/2017 | Ebrahimi et al. | |
| 2017/0330179 A1 | 11/2017 | Song et al. | |
| 2018/0019867 A1 | 1/2018 | Davis | |
| 2018/0198617 A1* | 7/2018 | Drouin | G06T 19/006 |
| 2019/0244186 A1 | 8/2019 | Guo et al. | |

FOREIGN PATENT DOCUMENTS

| | | |
|---|---|---|
| CN | 107682331 A | 2/2018 |
| CN | 107888384 A | 4/2018 |
| WO | 2016/202952 A1 | 12/2016 |

OTHER PUBLICATIONS

Olivier Alphand, "IoTChain: A Blockchain Security Architecture for the Internet of Things", Apr. 2018, hal-01705455, pp. 2-7 (Year: 2018).*

Alphand et al., "IoTChain: A Blockchain Security Architecture for the Internet of Things", 2018 IEEE Wireless Communications and Networking Conference (WCNC), IEEE, Apr. 15, 2018, pp. 1-6, XP033355380, DOI: 10.1109 WCNC.2018.8377385 [retrieved on Jun. 8, 2018] p. 1, right-hand column p. 3.

Notification of Transmittal of the International Search Report and the Written Opinion of the International Searching Authority (Forms PCT/ISA/220, PCT/ISA/210 and PCT/ISA/237) dated Jul. 3, 2019, by the European Patent Office in corresponding International Application No. PCT/US2019/024469. (15 pages).

First Office Action dated Oct. 29, 2021, issued in the corresponding Chinese Patent Application No. 201910358095.7, 12 pages including 6 pages of English Translation.

* cited by examiner

METHOD AND SYSTEM FOR ENHANCED LOGIN CREDENTIAL SECURITY VIA BLOCKCHAIN

FIELD

The present disclosure relates to enhancing the security of login credentials, specifically the use of a blockchain for storage of login credentials where distribution thereof is highly controlled such that only authorized entities may receive account tokens eligible for login of a user to receive account information and at times authorized by the user.

BACKGROUND

A goal of many websites on the Internet is to make things as easy as possible from a user standpoint, to encourage user registration and increase user retention. Many websites offer personalized experiences to users, which require the users to register with the website or otherwise provided personal information that can be used to tailor the experience to the user or otherwise provided personalized services to the user. However, in many instances, a complicated or time-consuming registration process may discourage the user from participating and result in the user leaving the website. Thus, websites are often seeking ways to make the registration process as quick and easy as possible for users.

One method that has become prevalent is the use of third-party services to log in to a website. In such a method, the website provides a link to the third-party service, which will ask permission from the user to share their information with the website in a single prompt, and then provide such information to the website upon acceptance by the user. The result is that the user is registered with the new website, and the new website has received their personal information, in as little as two clicks. These services, such as those offered by Facebook® or Google®, enable websites to offer personalized experiences to users while minimizing user impact, and also providing peace of mind to users that trust these third party services but may be wary of providing an e-mail address and password to the website.

However, while these services make it easier for a user to register or log in to a website, they often require the user to give up a level of control over their information. Traditionally, third party services operate by providing an account token, a digital data file that includes unique identification of the user and any other information necessary for the third party to identify the user's account information, to the website, which the website can present to the third party any time account information is desired. There arises a technical problem in that these account tokens are typically shareable and do not expire except as subject to any agreement between the website and the third party service. This enables websites that use the account tokens to identify common users via their tokens and share the tokens with other websites that have not been explicitly authorized. In addition, current processes make it difficult and time consuming for a user to control authorization of their account tokens, requiring the user to navigate to the third party service, log in, identify settings that enable the user to change permissions, identify the website for which the user would like to change permissions, and then actually change the permissions. This is a problem with the technology being employed, and it is a time consuming, and often confusing, process for users, which ends up discouraging the user from controlling access to their own personal information. Thus, there is a need for a technical solution to provide better user access and control over their account tokens and the usage thereof at websites.

SUMMARY

The present disclosure provides a description of systems and methods for secure storage and distribution of account tokens. A blockchain is used to store account tokens, preventing any single entity, including the third party service, from having complete control over and access to the user's account tokens. In addition, smart contracts or other suitable forms of data are used to control the access to and usage of each account token, such that only an authorized entity may obtain and use an account token and where expirations are built in to prevent sharing and misuse of the account token. The result is that websites must obtain a new account token each time personal information is desired, but where the account token can only be obtained if the website is authorized and where such authorization is explicitly allowed by the user on an ongoing basis. Thus, users have greater control over usage of account tokens for third party services, which provides greater control over their account information and who may obtain the information, as well as when. The processing server and blockchain network discussed below therefore provides a technological solution to the technical problem in existing third party login schemes for websites.

A method for secure storage and distribution of account tokens includes: storing, in a memory of a processing server, blockchain data, wherein the blockchain data is comprised of a plurality of blocks, each block including at least a block header and one or more data values, where each data value includes at least an identification value, an account token, and one or more usage rules; receiving, by a receiver of the processing server, a login request, wherein the login request includes at least a specific identification value and a set of credentials; identifying, by the processing server, a specific data value included in the blockchain data where the included identification value corresponds to the received specific identification value; validating, by the processing server, the set of credentials based on the identified specific data value and access to the account token included in the specific data value based on the included one or more usage rules; and electronically transmitting, by a transmitter of the processing server, the account token included in the identified specific data value in response to the login request upon successful validation.

A system for secure storage and distribution of account tokens includes: a memory of a processing server configured to store blockchain data, wherein the blockchain data is comprised of a plurality of blocks, each block including at least a block header and one or more data values, where each data value includes at least an identification value, an account token, and one or more usage rules; a receiver of the processing server configured to receive a login request, wherein the login request includes at least a specific identification value and a set of credentials; the processing server configured to identify a specific data value included in the blockchain data where the included identification value corresponds to the received specific identification value, and validate the set of credentials based on the identified specific data value and access to the account token included in the specific data value based on the included one or more usage rules; and a transmitter of the processing server configured to electronically transmit the account token included in the identified specific data value in response to the login request upon successful validation.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Secure Storage and Distribution of Account Tokens

Figure 1:
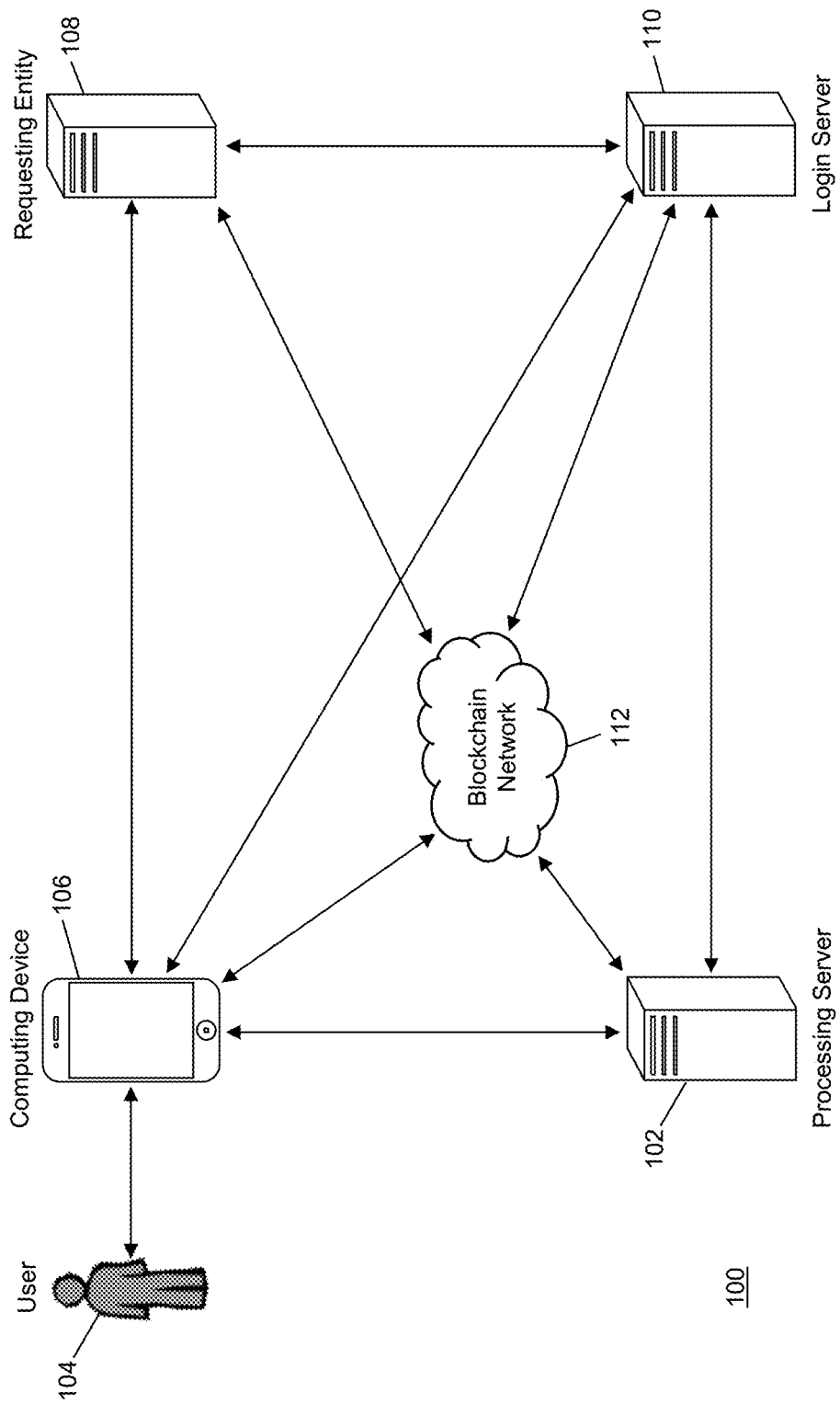
FIG. 1 is a block diagram illustrating a high level system architecture for the secure storage and distribution of account tokens in accordance with exemplary embodiments.

FIG. 1 illustrates a system 100 for the secure storage and distribution of account tokens used by websites and application programs for logging in a user via a third party service configured to provide account information associated with the user to the websites and application programs.

The system 100 may include a processing server 102. The processing server 102, discussed in more detail below, may be configured to assist in the secure storage of account tokens for login of a user 104 with a website, application program, or other service via the use of a third party login service that provides account information to the requesting service. The processing server 102 may be configured to utilize a blockchain for the storage of and providing access to account tokens associated with the user 104, as discussed in more detail below.

In the system 100, the user 104 may use a computing device 106 to access a service provided by a requesting entity 108. The computing device 106 may be any type of device suitable for performing the functions discussed herein, such as a desktop computer, laptop computer, notebook computer, tablet computer, cellular phone, smart phone, smart watch, smart television, smart appliance, wearable computing device, implantable computing device, etc. The service may be a website, application program, application programming interface, etc. that is operated by or otherwise access by the requesting entity 108. The requesting entity 108 may require that the user 104 provide account information in order to receive a personalized experience. For instance, the requesting entity 108 may request the user 104 to provide their e-mail address for contacting the user 104, their real name for providing personalized messages or information, their mailing address for the shipping of purchase goods to the user 104, or provide some sort of unique identifying information such that the requesting entity 108 can retain data associated with the user 104, such as account settings or data regarding the user's experience with the requesting entity 108. For example, the requesting entity 108 may operate a game that the user 104 wants to play, where the unique identifying information is used to save the user's progress and identify the user 104 when they return.

To provide the user 104 with greater flexibility and security, the requesting entity 108 may request that the user 104 log in to the requesting entity 108 via the use of a third party service, through a login server 110 operated by or on behalf thereof. The login server 110 may be one or more computing devices and/or systems that is configured to store account information associated with the user 104 that can be provided to requesting entities 108 upon authorization by the user 104. During the attempted registration with or access to the requesting entity 108, the user 104 may, via their computing device 106, interact with a hyperlink or other interact-able element to initiate a login process with the login server 110. The user 104 may then log in with the login server 110, such as by providing authentication information thereto. In traditional systems, the login server 110 would request that the user 104 provide authorization for the requesting entity 108 to access the user's account information. The login server 110 would then provide an account token to the requesting entity 108 associated with the user 104, which could be used by the requesting entity 108 to request account information for the user 104 from the login server 110 whenever desired (e.g., upon login by the user 104 with the requesting entity 108).

In the system 100, the processing server 102 may be configured to utilize a blockchain to provide controlled access to and usage of the account tokens for the user 104. The user 104 may provide authorization to the login server 110 for the requesting entity's access to the user's account information via the computing device 106. Upon authorizing the requesting entity 108, the login server 110 may generate an account token for use by the requesting entity 108 that is associated with the user 104. The account token may be a digital data file that includes at least unique identifying information associated with the user 104, such as an account identifier, which may be an identification number, registration number, e-mail address, device identifier (e.g., of the computing device 106) or other suitable value. In some cases, the account token may include additional data, such as an expiration time and/or date during which the account token may be eligible for use, information identifying the requesting entity 108 authorized to use the account token, time and/or date of generation or issuance of the account token, etc.

The account token may be provided by the login server 110 to the processing server 102 for storage thereof in a blockchain. The system 100 may include a blockchain network 112. The blockchain network 112 may be comprised of a plurality of nodes, where each node is configured to generate new blocks that comprise a blockchain, validate blocks generated by other nodes, and maintain a complete copy of the blockchain such that the blockchain is decentralized and can be accessed through any node in the blockchain network 112. In some embodiments, the processing server 102 may be a node and may be configured to perform the functions of a node in the blockchain network 112 as discussed herein. In other embodiments, the processing server 102 may be a separate computing device and/or system and in communication with one or more nodes in the blockchain network 112 using suitable communication networks and methods. In some cases, the processing server 102 may be part of or may operate as the login server 110.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network 112 prior to the generation and addition of a new block to the blockchain in order for the change to be made permanent. Computational and communication limitations may make such a modification exceedingly difficult, if not impossible, thus rendering the blockchain immutable.

Data values included in the blockchain may be related to an account token and usage thereof. When the login server 110 issues a new account token for use by a requesting entity 108, a new data value may be generated by the processing server 102 (e.g. or a node in the blockchain network 112 operating at the request of the processing server 102) that includes at least the account token, an identification value, and one or more usage rules. The identification value may be a unique identifier that is used to identify the data value for access thereto by the requesting entity 108, processing server 102, computing device 106, or other interested entity, device, or service. In some cases, a block may have a single identification value associated therewith, which may be shared among all data values included in that block. The one or more usage rules may be rules regarding access to the respective account token and usage thereof by a requesting entity 108. Usage rules may be rules regarding time and/or date of usage (e.g., a start date and/or an expiration date), what account information may be accessed via the account token, what requesting entities 108 are allowed to use the account token, permissions regarding sharing of the account token, etc. In some cases, expiration of the account token may be related to use of the particular account token (e.g., a new account token must be obtained following expiration) or to overall access to account tokens by the requesting entity 108 (e.g., authorization must be re-obtained from the user 104 for the generation of any new account tokens for the requesting entity 108). In former cases, a new data value may be generated upon the expiration of the account token that is stored in the blockchain that has a later expiration date. For instance, each account token may expire on a daily basis, where new blocks are added each day for new account tokens such that a requesting entity 108 must re-authenticate and re-confirm the user's authorization of access to their account information each day. In latter cases, the requesting entity 108 may repeat the registration process when the account token expires. In some instances, usage rules may include rules regarding both types of expiration.

The login server 110 may provide the account token for access to account information for use by the requesting entity 108 to the processing server 102, which may (e.g., directly or through a node of the blockchain network 112) have the account token included in a new data value stored in a new block that is generated and validated by other nodes in the blockchain network 112 using traditional methods and systems. In some cases, the one or more usage rules that accompany the account token may be provided by the user 104 when providing authorization to the login server 110 for generation of the account token. In other cases, the processing server 102 may communicate directly with the user 104 (e.g., via the computing device 106 using any suitable communication network and method) to obtain the one or more usage rules prior to generation of the data value. For example, the user 104 may be provided with prompts to select expiration periods, restrictions on sharing, what account information is obtainable by the requesting entity 108, etc.

Once the block has been added that includes the new data value, the processing server 102 may notify the login server 110, which may in turn notify the requesting entity 108. The requesting entity 108 may then retrieve an account token from the blockchain whenever the user 104 attempts to log in with the requesting entity 108. The requesting entity 108 may submit a login request to another entity in the system 110, such as to the login server 110, to the processing server 102, or directly to a node in the blockchain network 112. The login request may include the identification value for the data value that includes the account token requested by the requesting entity 108 (e.g., which may be provided by the user 104 in the login attempt) as well as a set of credentials associated with the requesting entity 108. In some cases, the identification value may be associated with the requesting entity 108, such as a unique identifier associated therewith that is used to associate a data value with the requesting entity 108 to which the included account token is issued. The set of credentials may include authentication data or other data used to validate that the requesting entity 108 is the entity for which an account token was issued, such as to prevent unauthorized access to or sharing of an account token. The set of credentials may include a digital signature, encryption key, password, or other value that may be suitable for use in verifying the entity of the requesting entity 108.

The processing server 102 (e.g., or other entity receiving the login request) may validate the requesting entity 108 via the provided set of credentials, and, if the validation is successful, identify the account token that is requested via the included identification value. The processing server 102 may then determine if usage of that account token is authorized based on the one or more usage rules included in the respective data value. For instance, the requesting entity 108 may be validated based on their credentials but may not be authorized for that particular account token based on the usage rules, or may be validated but may be trying to access an expired account token. If the one or more usage rules are met, the account token may be electronically transmitted to the requesting entity 108. The requesting entity 108 may then provide the account token to the login server 110 to receive account information associated with the user 104. In some embodiments, the account token may be provided to the processing server 102, which may forward the account token to the login server 110 for the account information, which may be in turn forwarded back to the requesting entity 108. In an exemplary embodiment, the account token may have an expiration time and/or date built in as indicated in the respective data value's usage rules, where the account token may be destroyed upon reaching the expiration time and/or date, or where the login server 110 may no longer provide any account information for the account token when the expiration time and/or date has passed.

In the system 100, the blockchain may be configured to continue to update the data values based on the usage rules associated therewith. For instance, as discussed above, expiration times and/or dates may be used such that new account tokens may be issued periodically for a requesting entity 108 as authorized by a user 104. In such cases, the processing server 102, or a node in the blockchain network 112, as applicable, may generate a new data value that has a new account token (e.g., issued by the login server 110 or the processing server 102 or a modification to a prior account token, as applicable) included therein with updated usage rules regarding expiration time and/or date that is added to the blockchain in a new block. In an example, each account token may expire daily, such that each day a new set of data values is generated to store new account tokens that will be valid for that day, but where a new data value may not be generated for a requesting entity 108 that is no longer authorized, either based on the usage rules or an explicit instruction of the user 104. For instance, the user 104 may submit an instruction to the processing server 102 (e.g., via the computing device 106) to stop access to an account token for a requesting entity 108. The processing server 102 may then generate a new data value that is added to the blockchain that indicates that the account token is expired, such as by adding a new account token with usage rules with an expiration date that has already passed such that an attempt to obtain the account token (e.g., using the same identification value) will be invalid. In some cases, a same identification value may be used for each account token for a user 104 and requesting entity 108, where login requests may look at only the most recent data value that includes that identification value.

In some embodiments, the system 100 may be configured to utilize smart contracts to perform functions associated with the blockchain. Smart contracts may be self-executable scripts that are stored in the blockchain, such as included in a data value, where they may be executed and perform functions for management of the blockchain and data stored therein. For instance, smart contracts may be used to determine compliance with usage rules, where such a contract may be executed upon attempted access to an account token stored in the respective data value. In another example, smart contracts may be used that are executed periodically and will result in a new data value being generated that will propagate or cancel the availability to an account token, as applicable. For instance, account tokens that are valid on a daily basis may have a smart contract included in the respective data value that will automatically execute at the end of the day to initiate the generation of a new data value for the next day, which will also include the same smart contract to continue the propagation of the account token.

In some embodiments, a blockchain may be used for a single user 104, where all of the data values stored therein may be related to the user 104. In other embodiments, the blockchain may store account tokens for multiple users 104, where each data value may include information identifying the user 104, or where the user 104 may be identified via the respective account token. In still other embodiments, a partitioned blockchain may be used, such as described in U.S. patent application Ser. No. 15/211,111, entitled "Method and System for Partitioned Blockchains and Enhanced Privacy for Permissioned Blockchains," filed on Jul. 15, 2016, by Steven C. Davis, which is herein incorporated by reference in its entirety.

The methods and systems discussed herein thus enable access to a user's account information to be securely controlled via the use of a blockchain that prevents unauthorized modification to usage rules and provides users with greater flexibility and control. In addition, use of the blockchain prevents the login server 110 from abusing use of account tokens and provides users 104 with easier access and control over the account tokens. The processing server 102, as discussed herein, therefore assists users 104 in the secure storage and distribution of account tokens that provides benefits to users 104, requesting entities 108, and login servers 110 that solve the technical problems that exist in traditional third party login systems.

Processing Server

Figure 2:
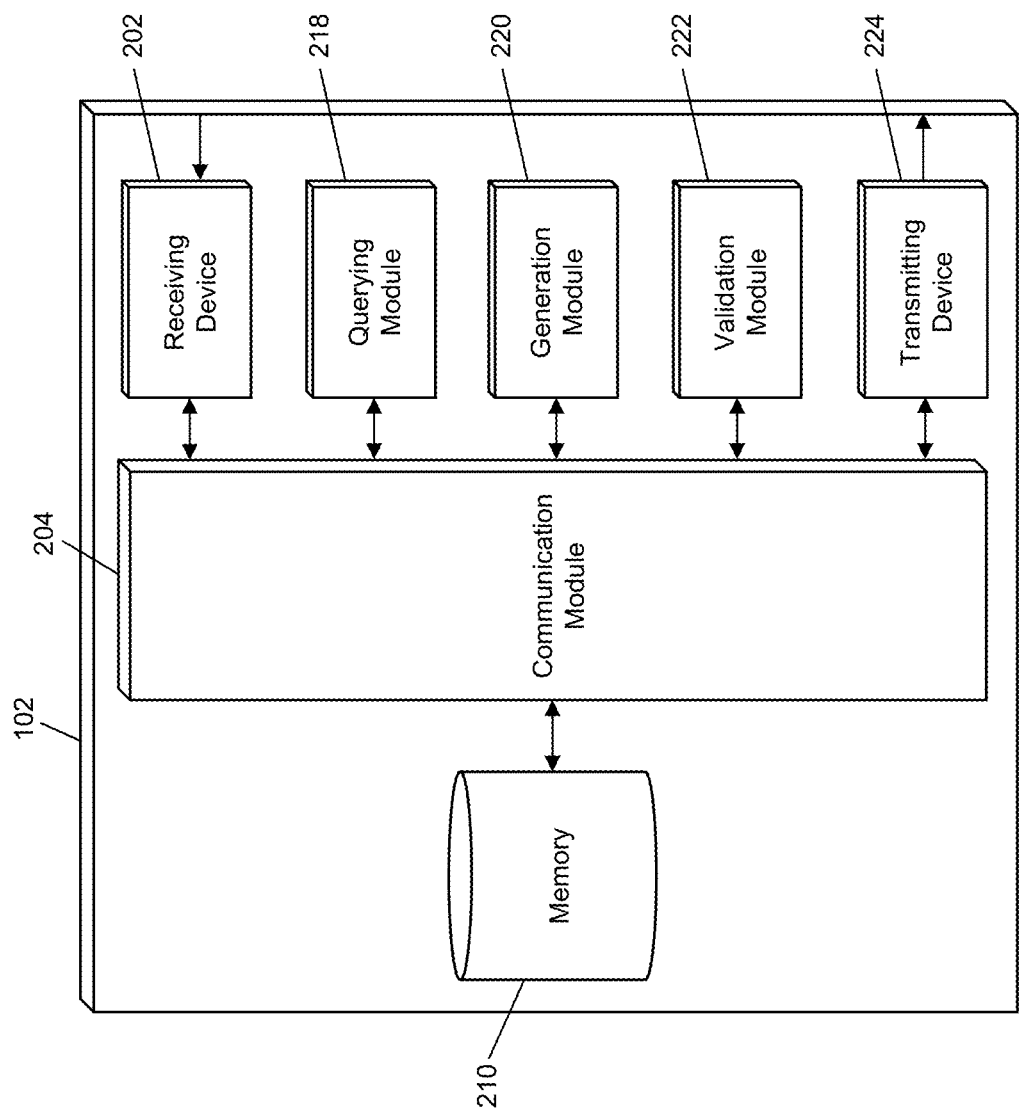
FIG. 2 is a block diagram illustrating the processing server of the system of FIG. 1 for securely storing and distributing account tokens in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from computing devices 106, requesting entities 108, login servers 110, blockchain networks 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by computing devices 106 that are superimposed or otherwise encoded with request for deactivation or other modification to account token usage rules, which may include the identification value for an account token and the modifications to or sets of updated usage rules. The receiving device 202 may also be configured to receive data signals electronically transmitted by requesting entities 108 or login servers 110 that are superimposed or otherwise encoded with login requests, which may include credentials and an identification value for which an account token is requested. The receiving device 202 may be further configured to receive data signals electronically transmitted by login servers 110, which may be superimposed or otherwise encoded with account tokens and other data for use in the registration thereof, such as an identification value, usage rules, etc. The receiving device 202 may also be configured to receive data signals electronically transmitted by nodes in the blockchain network 112, such as may be superimposed or otherwise encoded with new data values, new blocks for validation, or blocks that have been validated and added to the blockchain.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, validation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a memory 210. The memory 210 may be configured to store data for use by the processing server 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein. The memory 210 may be configured to store, for example, blockchain data, hashing algorithms for generating blocks, credentials for validation, usage rule templates, communication data for blockchain nodes, etc.

The processing server 102 may include a querying module 218. The querying module 218 may be configured to execute queries on databases to identify information. The querying module 218 may receive one or more data values or query strings, and may execute a query string based thereon on an indicated database, such as the memory 210, to identify information stored therein. The querying module 218 may then output the identified information to an appropriate engine or module of the processing server 102 as necessary. The querying module 218 may, for example, execute a query on the memory 210 to identify a data value stored in the blockchain that corresponds to an identification value included in a received login request for use in validating a requesting entity 108 to determine if an account token should be distributed thereto.

The processing server 102 may also include a generation module 220. The generation module 220 may be configured to generate data for use by the processing server 102 in performing the functions discussed herein. The generation module 220 may receive instructions as input, may generate data based on the instructions, and may output the generated data to one or more modules of the processing server 102. For example, the generation module 220 may be configured to generate notifications and other data messages for transmission to computing devices 106, such as prompts for requesting usage rules, etc. The generation module 220 may also be configured to generate data values, block headers, and blocks for inclusion in the blockchain. In some cases, the processing server 102 may be a node in the blockchain network 112 and may generate blockchain data for verification by other nodes.

The processing server 102 may also include a validation module 222. The validation module 222 may be configured to perform validations for the processing server 102 as part of the functions discussed herein. The validation module 222 may receive instructions as input, may validate data as instructed, and may output a result of the validation to another module or engine of the processing server 102. In some cases, the data to be validated may be included in the input to the validation module 222. In other cases, the validation module 222 may be configured to identify the data for validation. The validation module 222 may be configured to, for example, validate sets of credentials included in login requests, and validate access to an account token based on usage rules included in an associated blockchain data value.

The processing server 102 may also include a transmitting device 224. The transmitting device 224 may be configured to transmit data over one or more networks via one or more network protocols. In some instances, the transmitting device 224 may be configured to transmit data to computing devices 106, requesting entities 108, login servers 110, blockchain networks 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to computing devices 106 that may be superimposed or otherwise encoded with requests for usage controls or notifications regarding access to and actions performed in associated with account tokens associated with the associated user 104. The transmitting device 224 may also be configured to electronically transmit data signals to requesting entities 108 and/or login servers 110 that are superimposed or otherwise encoded with account tokens as identified in data values in the blockchain, and, in some cases, may be superimposed or otherwise encoded with account information obtained using an account token. The transmitting device 224 may also be configured to electronically transmit data signals to nodes in the blockchain network 112, which may include data for inclusion in a new data value or may include data values, block headers, or blocks themselves for validation and/or inclusion in the blockchain.

Process for Registration of an Account Token

Figure 3:
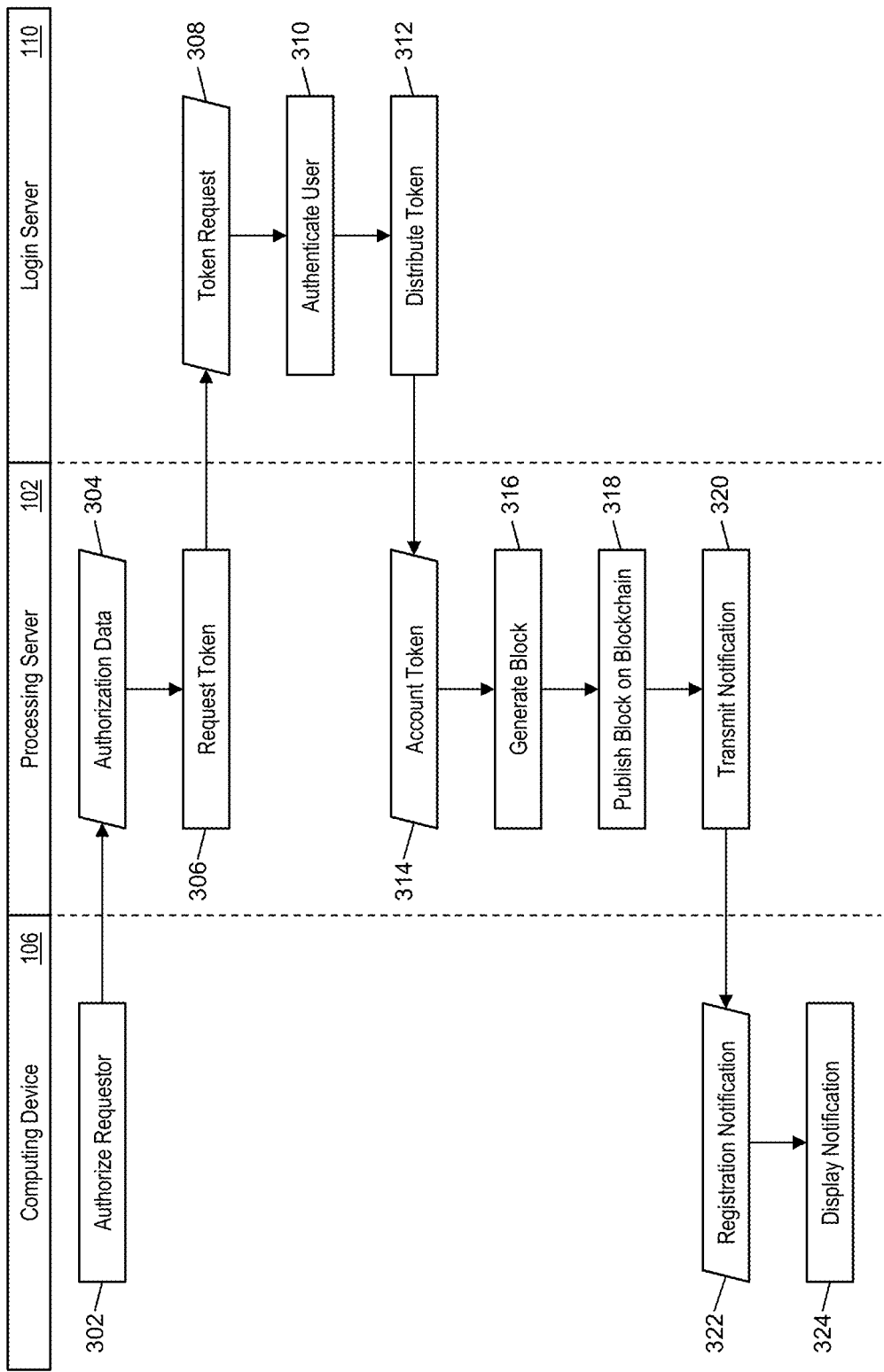
FIG. 3 is a flow diagram illustrating a process for the registration and storage of an account token in a blockchain in the system of FIG. 1 in accordance with exemplary embodiments.

FIG. 3 illustrates an example process for the generation and registration and of a new account token by the processing server 102 in the blockchain network 112 for use by a requesting entity 108 for login with the login server 110 to retrieve account information for a user 104.

In step 302, the user 104 may, via the computing device 106, submit their authorization of access to their account information for the requesting entity 108 to the processing server 102. The submission may be submitted to the processing server 102 via any suitable communication network and method, and include information identify the user's account with the login server 110, the requesting entity 108 for which the access is being authorized, and authentication data. In step 304, the receiving device 202 of the processing server 102 may receive the submission. In step 306, the transmitting device 224 of the processing server 102 may electronically transmit a token request to the login server 110 via a suitable communication network and method that includes at least the provided account identifying information and authentication data.

In step 308, the login server 110 may receive the token request from the processing server 102. In step 310, the login server 110 may authenticate the user 104 using the provided authentication data. In some cases, the authentication data may identify the user 104, where the login server 110 may contact the user 104 separately for authentication thereof. Upon successful authentication, in step 312, the login server 110 may provide an account token associated with the user's account to the processing server 102. In some cases, the account token may include data associating it with the requesting entity 108 for which it was requested. In such cases, the token request may have included the identifying information provided by the user 104 for the requesting entity 108.

In step 314, the receiving device 202 of the processing server 102 may receive the account token from the login server 110. In step 316, the generation module 220 of the processing server 102 may generate a new block for addition to the blockchain, which may include a block header and one or more data values including a data value for the account token, including the account token, an identification value (e.g., associated with the requesting entity 108 as provided by the user 104 or unique to the data value and/or account token), and one or more usage rules. The usage rules may have been included in the data provided by the computing device 106 or may be requested separately from the computing device 106 as part of step 316. In step 318, the newly-generated block may be validated by one or more nodes in the blockchain network 112 and, once validated, added, i.e., published, to the blockchain.

In step 320, the transmitting device 224 of the processing server 102 may electronically transmit a notification to the computing device 106 to inform the user 104 that the account token was successfully registered and is available for use by the requesting entity 108. In step 322, the computing device 106 may receive the notification from the processing server 102. In step 324, the computing device 106 may display the notification on a display device interfaced therewith for viewing by the user 104. The user 104 may then proceed to, via the computing device 106, login with the requesting entity 108 such that the requesting entity 108 may use the account token for login and retrieval of the user's account information, as discussed herein.

Process for Distribution of an Account Token

Figure 4:
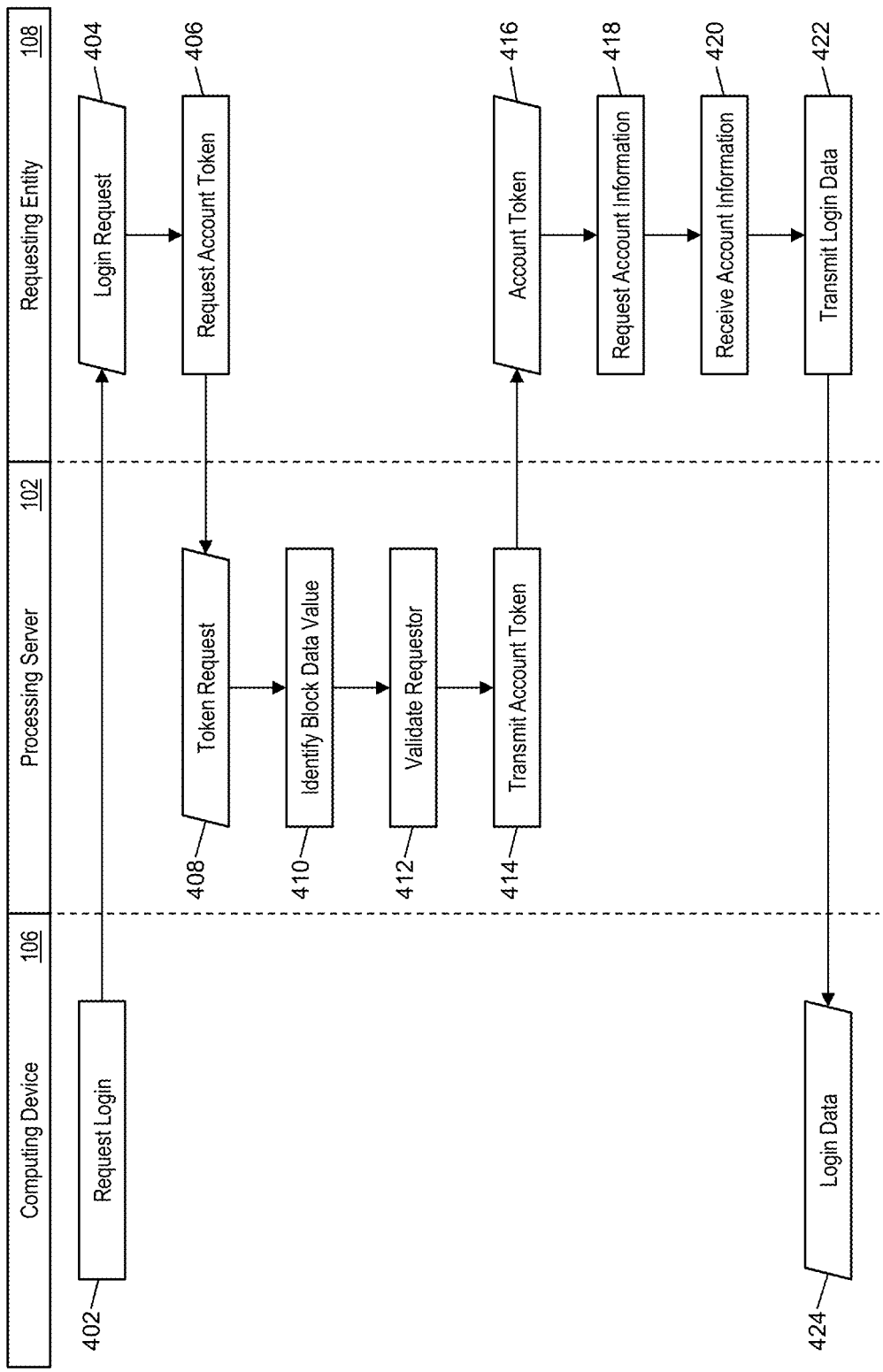
FIG. 4 is a flow diagram illustrating a process for the authorization and usage of an account token stored in a blockchain in the system of FIG. 1 in accordance with exemplary embodiments.

FIG. 4 illustrates a process executed in the system 100 of FIG. 1 for the distribution of a registered account token to a requesting entity 108 for login of the user 104, where the account token is securely stored in a blockchain.

In step 402, the user 104 may, via the computing device 106, request login with the requesting entity 108 using a suitable method, such as via a website, application program, or other point of interaction with the requesting entity 108. In step 404, the requesting entity 108 may receive a login request from the computing device 106. The login request may include at least an indication that login via the blockchain is requested. In cases where the blockchain may be a partitioned blockchain or may include data for multiple users, the login request may include data associated with the user 104 for identification of the appropriate account token. In other cases, the login request may include data used to identify the blockchain associated with the user 104. In step 406, the requesting entity 108 may submit to the processing server 102 a token request to request an account token for the user 104.

In step 408, the receiving device 202 of the processing server 102 may receive the token request. The token request may be submitted directly to the processing server 102 by the requesting entity 108, or may be submitted to the login server 110 and forwarded to the processing server 102 thereby. The token request may include at least an identification value (e.g., associated with the requesting entity 108 or provided in the login request) and a set of credentials for the requesting entity 108. In step 410, the querying module 218 of the processing server 102 may execute a query on the memory 210 of the processing server 102 to identify a data value stored in the blockchain that includes the identification value included in the token request. In cases where the identification value is used for multiple data values, the querying module 218 may identify the most recent data value (e.g., based on timestamp in the respective block header) in the blockchain that includes the identification value.

In step 412, the validation module 222 of the processing server 102 may validate the requesting entity 108 using the provided set of credentials (e.g., included in the token request) as well as validating if the requesting entity 108 is authorized to access the account token in addition to validity of the account token itself using the one or more usage rules included in the identified data value. Upon successful validation, in step 414, the transmitting device 224 of the processing server 102 may electronically transmit the account token included in the identified data value to the requesting entity 108, either directly or via the login server 110.

In step 416, the requesting entity 108 may receive the account token. In step 418, the requesting entity 108 may provide the account token to the login server 110 in a request for account information associated with the user 104. The login server 110 may identify the user's account using the account token and provide account information authorized by the user 104 (e.g., identified in a profile of the user or the account token itself) to the requesting entity 108, for receipt thereby in step 420. In step 422, the requesting entity 108 may then provide personalized data to the computing device 106 based on the account information received from the login server 110. In step 424, the computing device 106 may receive login data that is personalized to the user 104 from the requesting entity 108, for display thereto.

Exemplary Method for Secure Storage and Distribution of Account Tokens

Figure 5:
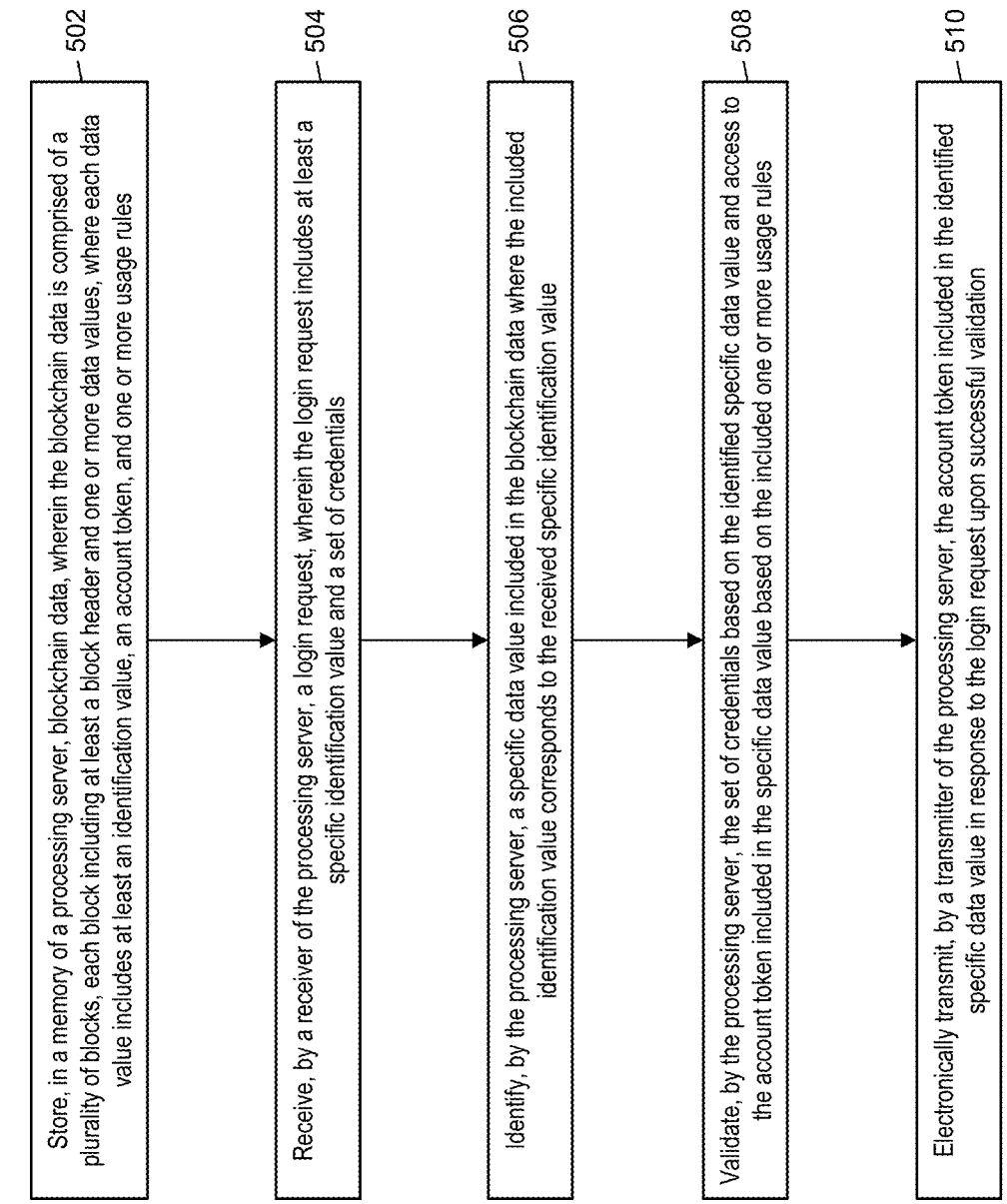
FIG. 5 is a flow chart illustrating an exemplary method for processing a controlled payment number transaction in accordance with exemplary embodiments.

FIG. 5 illustrates a method 500 for the secure storage of account tokens using a blockchain and distribution thereof to authorized entities based on usage rules associated with the account token.

In step 502, blockchain data may be stored in a memory (e.g., the memory 210) of a processing server (e.g., the processing server 102), wherein the blockchain data is comprised of a plurality of blocks, each block including at least a block header and one or more data values, where each data value includes at least an identification value, an account token, and one or more usage rules. In step 504, a login request may be received by a receiver (e.g., the receiving device 202) of the processing server, wherein the login request includes at least a specific identification value and a set of credentials.

In step 506, a specific data value included in the blockchain data may be identified by the processing server (e.g., via the querying module 218 thereof) where the included identification value corresponds to the received specific identification value. In step 508, the set of credentials may be validated by the processing server (e.g., via the validation module 222 thereof) based on the identified specific data value and access to the account token included in the specific data value based on the included one or more usage rules. In step 510, the account token included in the identified specific data value may be electronically transmitted by a transmitter (e.g., the transmitting device 224) of the processing server in response to the login request upon successful validation.

In one embodiment, each data value may further include authentication credentials, and validating the set of credentials may include determining if the received set of credentials is identical to the authentication credentials included in the specific data value. In some embodiments, the login request may further include a requestor identifier, and validating the set of credentials may further include determining if an entity associated with the requestor identifier is authorized access to the account token included in the specific data value based on the included one or more usage rules. In one embodiment, the account token included in the specific data value may be subject to the included one or more usage rules. In some embodiments, each data value may further include a smart contract, validating the set of credentials may include executing the smart contract included in the specific data value, and electronic transmission of the account token may be further based on a successful result of the execution of the smart contract.

In one embodiment, the method 500 may further include: receiving, by the receiver of the processing server, a deactivation request, wherein the deactivation request includes a target identification value; generating, by the processing server (e.g., via the generation module 220 thereof), a new block including at least a new block header and a new data value, wherein the new data value includes at least an account token included in a target data value where the included identification value corresponds to the target identification value and one or more usage rules, where at least one of the one or more usage rules indicates deactivation of the account token; and electronically transmitting, by the transmitter of the processing server, the generated new block. In a further embodiment, the login request may be received from a first computing system (e.g., the login server 110 or requesting entity 108), and the deactivation request may be received from a second computing system (e.g., the computing device 106) separate from the first computing system. In another further embodiment, the deactivation request may be received upon execution of a smart contract included in the identified specific data value.

Computer System Architecture

Figure 6:
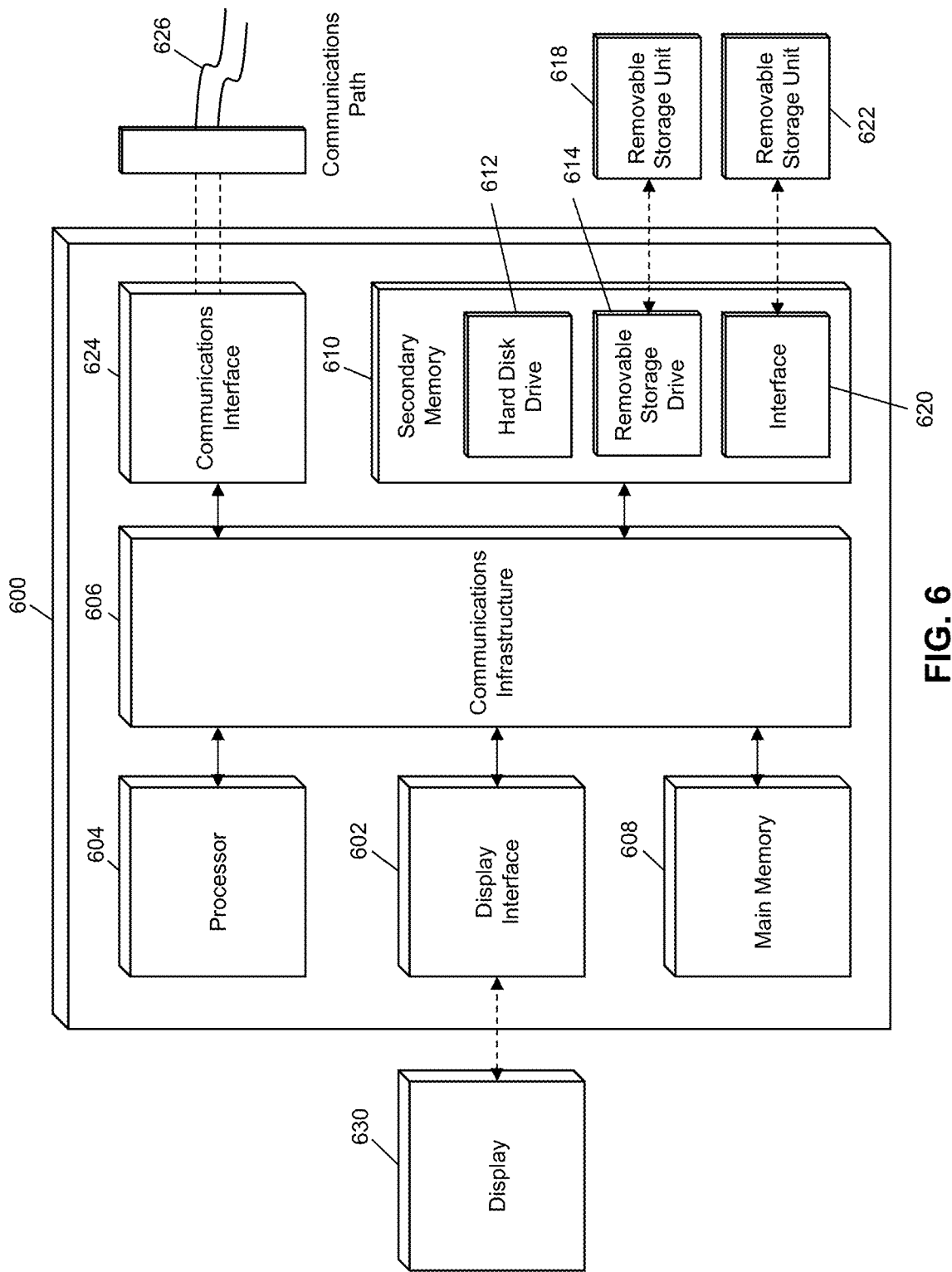
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for secure storage and distribution of account tokens. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for secure storage and distribution of account tokens, comprising:
storing, in a memory of a processing server, blockchain data, wherein the blockchain data is comprised of a plurality of blocks, each block including at least a block header and one or more data values, where each data value includes at least an identification value, an account token, one or more usage rules, and a smart contract, the one or more usage rules defining access to the account token by a first computing device;
receiving, by a receiver of the processing server, a login request from the first computing device, wherein the login request includes at least a specific identification value and a set of credentials;
identifying, by the processing server, a specific data value included in the blockchain data where the included identification value corresponds to the received specific identification value;
validating, by the processing server, the set of credentials based on executing the smart contract included in the identified specific data value and access to the account token included in the specific data value based on the included one or more usage rules; and
electronically transmitting, by a transmitter of the processing server, to the first computing device the account token included in the identified specific data value in response to the login request upon successful validation, wherein successful validation is the result of successful execution of the smart contract.

2. The method of claim 1, wherein
each data value further includes authentication credentials, and
validating the set of credentials includes determining if the received set of credentials is identical to the authentication credentials included in the specific data value.

3. The method of claim 1, wherein
the login request further includes a requestor identifier, and
validating the set of credentials further includes determining if an entity associated with the requestor identifier is authorized access to the account token included in the specific data value based on the included one or more usage rules.

4. The method of claim 1, further comprising:
receiving, by the receiver of the processing server, a deactivation request, wherein the deactivation request includes a target identification value;
generating, by the processing server, a new block including at least a new block header and a new data value, wherein the new data value includes at least an account token included in a target data value where the included identification value corresponds to the target identification value and one or more usage rules, where at least one of the one or more usage rules indicates deactivation of the account token; and
electronically transmitting, by the transmitter of the processing server, the generated new block.

5. The method of claim 4, further comprising:
receiving, by the processing server, the deactivation request from a second computing device separate from the first computing device.

6. The method of claim 4, wherein the deactivation request is received upon execution of the smart contract included in the identified specific data value.

7. The method of claim 1, wherein the first computing device is a website or an application program, and the account token is used by the website or the application program for login of a user via a second computing device, the second computing device configured to provide account information of the user to the first computing device.

8. The method of claim 1, wherein the account token includes one or more of an expiration time, an expiration date, information identifying a requesting entity authorized to use the account token, and time and/or date of generation or issuance of the account token.

9. The method of claim 1, wherein the account token has an expiration date, further comprising:
issuing, by the processing server, a new account token in accordance with the one or more usage rules upon a reaching of the expiration date of the account token.

10. The method of claim 1, wherein the blockchain data is for a single user.

11. The method of claim 1, wherein the set of credentials include authentication data or other data used to validate that the first computing device is the entity for which the account token was issued.

12. The method of claim 1, wherein the set of credentials include a digital signature, encryption key, or password for use in verifying an entity associated with the first computing device.

13. The method of claim 1, further comprising:
receiving, by the processing server, the account token from the first computing device with a request to receive account information associated with a user from a second computing device;
forwarding, by the processing server, the account token to the second computing device;
receiving, by the processing server, the account information associated with the user; and
forwarding, by the processing server, the account information associated with the user to the first computing device.

14. The method of claim 1, wherein the account token is valid on a daily basis and the smart contract includes in the respective data value that the account token will automatically execute to initiate a generation of a new data value the next to continue the propagation of the account token until receipt of a deactivation request of the account token.

15. A system for secure storage and distribution of account tokens, comprising:
a memory of a processing server configured to store blockchain data, wherein the blockchain data is comprised of a plurality of blocks, each block including at least a block header and one or more data values, where each data value includes at least an identification value, an account token, one or more usage rules, and a smart contract, the one or more usage rules defining access to the account token by a first computing device;
a receiver of the processing server configured to receive a login request from the first computing device, wherein the login request includes at least a specific identification value and a set of credentials;
the processing server configured to
identify a specific data value included in the blockchain data where the included identification value corresponds to the received specific identification value, and
validate the set of credentials based on executing the smart contract included in the identified specific data value and access to the account token included in the specific data value based on the included one or more usage rules; and
a transmitter of the processing server configured to electronically transmit to the first computing device the account token included in the identified specific data value in response to the login request upon successful validation, wherein successful validation is the result of successful execution of the smart contract.

16. The system of claim 15, wherein
each data value further includes authentication credentials, and
validating the set of credentials includes determining if the received set of credentials is identical to the authentication credentials included in the specific data value.

17. The system of claim 15, wherein
the login request further includes a requestor identifier, and
validating the set of credentials further includes determining if an entity associated with the requestor identifier is authorized access to the account token included in the specific data value based on the included one or more usage rules.

18. The system of claim 15, wherein
the receiver of the processing server is further configured to receive a deactivation request, wherein the deactivation request includes a target identification value,
the processing server is further configured to generate a new block including at least a new block header and a new data value, wherein the new data value includes at least an account token included in a target data value where the included identification value corresponds to the target identification value and one or more usage rules, where at least one of the one or more usage rules indicates deactivation of the account token, and
the transmitter of the processing server is further configured to electronically transmit the generated new block.

19. The system of claim 18, wherein
the deactivation request is received from a second computing device separate from the first computing device.

20. The system of claim 18, wherein the deactivation request is received upon execution of the smart contract included in the identified specific data value.

* * * * *